Figure 1:
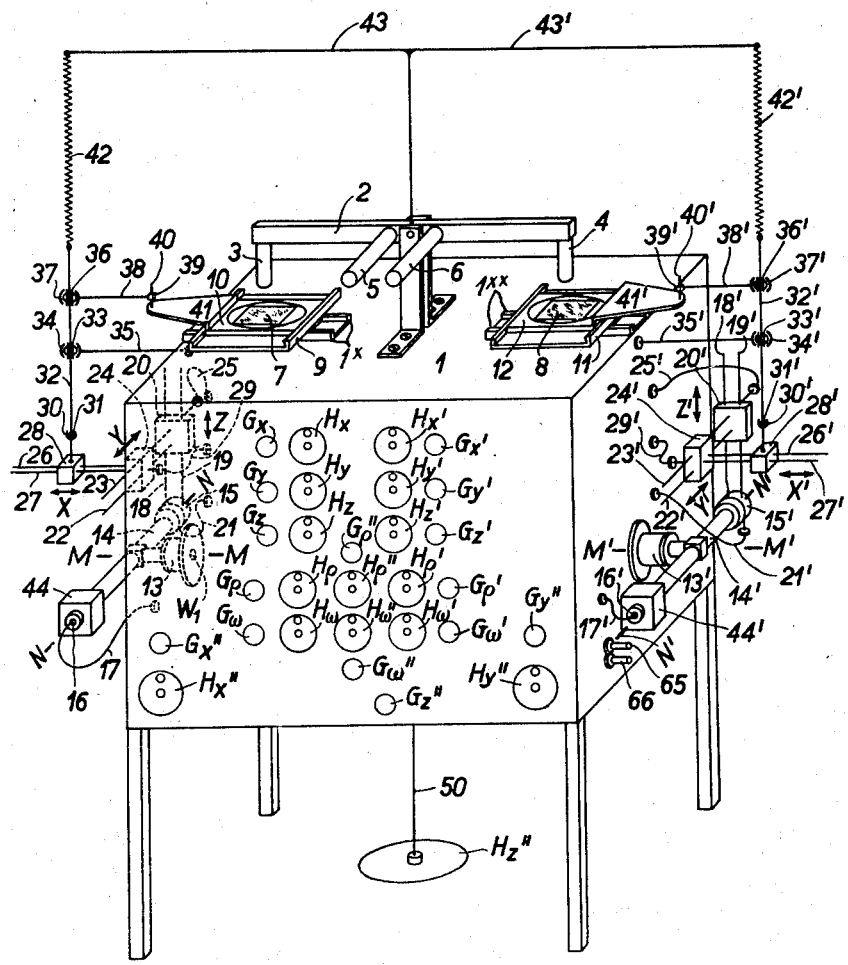

Oct. 23, 1945.   W. BAUERSFELD   2,387,555
APPARATUS FOR PLOTTING MAPS FROM PHOTOGRAPHS
Filed Jan. 5, 1940   2 Sheets-Sheet 1

Inventor:
Walther Bauersfeld.

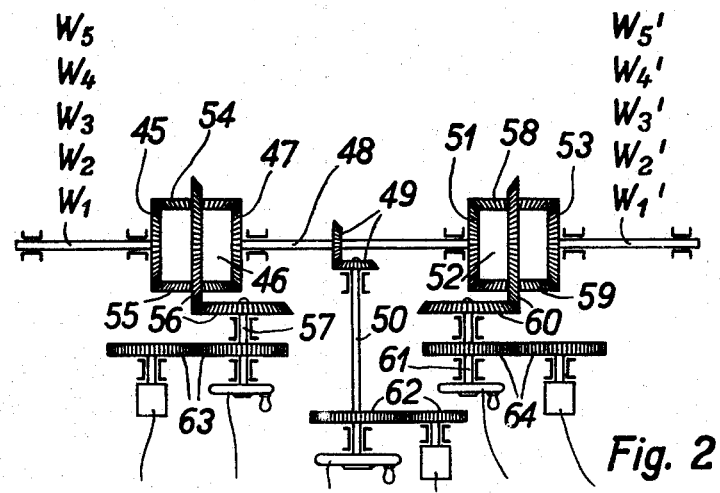
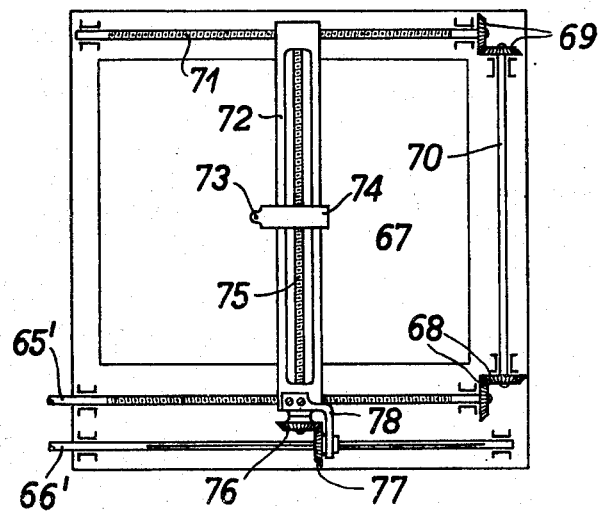

Patented Oct. 23, 1945

2,387,555

UNITED STATES PATENT OFFICE 2,387,555

APPARATUS FOR PLOTTING MAPS FROM PHOTOGRAPHS

Walther Bauersfeld, Jena, Germany; vested in the Alien Property Custodian

Application January 5, 1940, Serial No. 312,533
In Germany January 18, 1939

7 Claims. (Cl. 33—20)

The invention relates to an apparatus equipped with a fixed binocular observation system for the stereophoto-grammetrical plotting of two photo plates, each of which is displaceable relative to the observation system and parallel to its emulsion-plane by means of a guide rod capable of a universal angular movement about a fixed point.

In order to make such an apparatus adaptable for the plotting of aerial photographs taken in any respective position of the recording cameras, without requiring any alteration in the respective inclination of the photo plates and thus obviating a complicated system of observation, provision is made, in accordance with this invention, for a three-component, spatial system of cross-slides for controlling each of the two guide rods. The carrier of each of the two cross-slide systems is mounted capable of performing universal swivelling movements relative to the observation system, the slides of each of the three pairs of individually corresponding slides of the two cross-slide systems being coupled for the purpose of a joint drive in such a manner that a given movement of the driving member produces equal displacements of these two slides.

In order to avoid being tied down to a given focal distance it is advisable that each of the two joints by which the two guide rods engage the plate carriers, is adjustably disposed relative to the respective fulcrum of the guide rod in a direction perpendicular to the emulsion plane of the respective photo plate. If necessary, also each fulcrum of the guide rod can be adjustably disposed relative to the respective photo plate.

In order to give the photo plates, before plotting, that particular position relative to the observation system necessary to meet requirements with regard to the length of the camera base line and to the desired plotting scale, it is expedient to assign to the driving device of each of the said three pairs of slides at least one differential permitting a reciprocal adjustment of the two slides of each pair in accordance with the component of the camera base line corresponding to the directions of displacement of the two slides.

It is recommended that each of the two guide rods rests on the respective cross-slide system and is coupled with a device in order to nullify at the point of the fixed fulcrum of the guide rod, for any position of the latter, the bearing pressure acting in a direction perpendicular to the guide rod. For this purpose it is of advantage that on the free end of each of the two guide rods a spring engages, which is mounted on the framework of the apparatus and capable of performing a universal angular movement about a point situated perpendicularly over the fixed fulcrum of the guide rod and whose distance from the said fulcrum should suitably be at least as long as the length of the guide rod.

Figure 4:
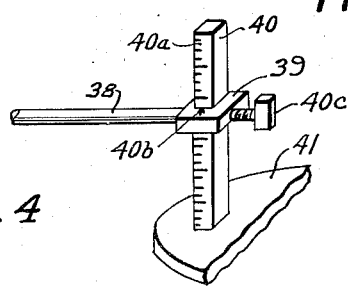

In Fig. 1 of the accompanying drawings, diagrammatically, a perspective view is given illustrating a constructional example of a plotting apparatus according to the invention for tracing horizontal projections of a landscape derived by the stereoscopical observation of two photo plates obtained by aerial photography. Fig. 2 illustrates a driving mechanism, Fig. 3 the tracing table of the apparatus in question, and Fig. 4 shows in detail one of the adjusting devices employed in the apparatus.

The plotting apparatus comprises a housing 1, to which a binocular observation instrument 2 is fitted, the objective sleeves and eyepiece sleeves being designated 3 and 4, and 5 and 6, respectively. The observation instrument contains two marks which form a spatial image. The observation instrument serves for the stereoscopical observation of two photo plates 7 and 8, each plate representing a stereoscopic half-image of the object to be measured. Said plates 7 and 8, are displaceably mounted, parallel to their emulsion planes, on housing 1 in such a manner that the emulsion planes lie perpendicular to the viewing direction of the observation instrument. A cross-slide system consisting of two slides 9 and 10 displaceable relative to each other at right angles serves for shifting the photo plate 7, whilst for shifting photoplate 8 a cross-slide system is provided for consisting of two slides 11 and 12 displaceable relative to each other at right angles. Slide 9 is mounted for rectilinear sliding movement on a guide $1^x$ and slide 11 is mounted for rectilinear sliding movement on a guide $1^{xx}$, said guides $1^x$ and $1^{xx}$ being attached to the top of housing 1. By displacing the plates 7 and 8 relatively to the observation instrument the spatial image of the marks can be brought into coincidence with the different superficial points of the spatial image of the object to be measured. In order to allow for swinging, each of the photo plates on the top slide of the respective cross-slide systems 9, 10, and 11, 12, respectively, is rotatably mounted about an axis which lies at right angles to the directions of displacement of the two slides of each cross-slide system.

The following arrangement has been adopted for adjusting the slides 9 and 10 of the cross-slide system carrying photo plate 7 relative to the binocular observation instrument 2. On the bearing 13 screwed to housing 1 a box 14, by means of a shaft $W_1$ (cf. Fig. 2) is mounted for rotations about an axis M—M parallel to the direction of displacement of slide 9. In the box 14 by means of a shaft 16 a supporting member 15 is mounted for rotations about an axis N—N intersecting the axis M—M at right angles. To balance the weight, box 14 carries a counter poise 44. By means of a flexible shaft 17, the shaft 16 which rotates the supporting member 15 about axis N—N, is coupled with shaft $W_2$ (cf. Fig. 2) parallel to shaft $W_1$ and rotatably mounted on housing 1. The supporting member 15 carries two spindles 18 and 19, whose axes are parallel to one another and determine a plane perpendicular to the axis N—N. The spindle 18 is fixed against rotation on the supporting member 15 whereas the spindle 19 is mounted in a bearing carried by the supporting member 15 and is adapted to rotate in said member. The spindle 19 is provided with a screw thread and by means of a flexible shaft 21 is coupled with a shaft $W_3$ (cf. Fig. 2) parallel to shaft $W_1$ and rotatably mounted on housing 1. A slide 20 threadedly engages spindle 19 and slidably engages spindle 18. By rotating shaft $W_3$ slide 20 can be displaced in a direction indicated by an arrow and designated Z. The slide 20 carries two spindles 22 and 23 whose axes are parallel to the axis N—N. The spindle 23 is provided with a screw thread and by means of a flexible shaft 25 is coupled with a shaft $W_4$ (cf. Fig. 2) parallel to shaft $W_1$ rotatably mounted on housing 1. A slide 24 threadedly engages spindle 23 and slidably engages spindle 22. By rotating shaft $W_4$ slide 24 can be displaced in a direction indicated by an arrow and designated Y, said direction lying at right angles to the direction of displacement Z. The slide 24 carries two spindles 26 and 27, whose axes are parallel to one another and at right angles to the plane determined by the directions of displacement Z and Y. The spindle 27 is provided with a screw thread and by means of a flexible shaft 29 is coupled with a shaft $W_5$ (cf. Fig. 2) parallel to shaft $W_1$ and rotatably mounted on housing 1. A slide 28 threadedly engages spindles 27 and slidably engages spindle 26. By rotating shaft $W_5$ slide 28 can be displaced in a direction indicated by an arrow and designated X, said direction lying at right angles to the directions of displacement Y and Z. The slide 28 carries the spherical socket 30 of a ball bearing whose ball 31 is attached to one end of a guide rod 32. The guide rod 32 is displaceable in two sleeves one of which, 33, is mounted for universal angular movements in a ball socket 34 fitted to housing 1 by means of an arm 35, whilst the other, 36, also for universal angular movements, is mounted in a ball socket 37 fixed to arm 38. By means of a slide fitting 39 (Fig. 4), the arm 38 is adjustable along a square pin 40 which is so disposed on a plate 41 firmly connected with the slide 10 that its axis is at right angles with the emulsion plane of the photo plate 7. By adjusting the arm 38 along the pin 40, the component of the mutual distance between the ball joints 33, 34, and 36, 37 which is at right angles to the emulsion plane of the photo plate 7, can be set in accordance with the focal distance to which the camera was adjusted when the photo plate 7 was exposed. The indicating device (a scale $40a$ on pin 40 and an index $40b$ on the slide fitting 39) as well as a clamping device $40c$ for clamping the arm 38 relative to pin 40, required for such setting, have been shown in detail in Fig. 4. By means of a spring 42 engaging the free end of the guide rod 32, the latter is so suspended on one arm, 43, of a double-armed cross beam firmly connected with the binocular observation system, that the point of application of spring 42 on the arm 43 lies perpendicularly over the ball joint 33, 34. The length of the spring 42 somewhat exceeds that of the guide rod 32.

For adjusting the slides 11 and 12 of the cross-slide system carrying photo plate 8 relative to the binocular observation system 2 provision is made for an arrangement which is identically the same, as reflected by a mirror, as the arrangement coordinated to photo plate 7, as described in the aforegoing. The individual parts of this arrangement are designated exactly like the corresponding parts of the described arrangement except for an index line added to each designation.

For adjusting the five pairs of shafts $W_1$, $W'_1$; $W_2$, $W'_2$; $W_3$, $W'_3$; $W_4$, $W'_4$ and $W_5$, $W'_5$ five gearings of the design shown in Fig. 2 are provided for. Excepting those parts of the five gearings displayed in Fig. 1 of some of the gearings and which for this reason must have several designations, each part bears one designation only. Each of the five shafts $W_1$, $W_2$, $W_3$, $W_4$ and $W_5$ carries the one crown gear 45 of a differential gear 46, whose other crown gear 47 is mounted upon a shaft 48 which, by means of a pair of bevel gears 49 can be driven through a shaft 50. Shaft 48 also carries the one crown gear 51 of a second differential gear, 52, whose other crown gear 53 is mounted on the shaft $W'_1$; $W'_2$; $W'_3$; $W'_4$; $W'_5$; respectively. By means of a pair of bevel gears 56 and of a shaft 57 a rotation can be imparted to the planetary pinions 54 and 55 of the differential gear 46, about the common axis of the crown gears 45 and 47, whilst the planetary pinions 58 and 59 of the differential gear 52 can be rotated about the common axis of the crown gears 51 and 53 by means of a pair of bevel gears 60 and of a shaft 61. For driving the shafts 50, 57 and 61, driving disks are provided for as follows: driving disks $H''_\omega$, $H_\omega$, $H'_\omega$ respectively, for the gearing for adjusting the pair of shafts $W_1$, $W'_1$; driving disks $H''_s$, $H_s$, $H'_s$, respectively, for the gearing for adjusting the pair of shafts $W_2$, $W'_2$; driving disks $H''_z$, $H_z$, $H'_z$, respectively, for the gearing for adjusting the pair of shafts $W_3$, $W'_3$; driving disks $H''_y$, $H_y$, $H'_y$, respectively, for the gearing for adjusting the pair of shafts $W_4$, $W'_4$; and driving disks $H''_x$, $H_x$, $H'_x$, respectively, for the gearing for adjusting the pair of shafts $W_5$, $W'_5$. The driving disk $H''_z$ is a foot operated disk (cf. Fig. 1).

The driving disks $H''_\omega$, $H''_s$, $H''_z$, $H''_y$, and $H''_x$ are coupled with the counting mechanisms $G''_\omega$, $G''_s$, $G''_z$, $G''_y$, $G''_x$, respectively, by means of a pair of toothed wheels 62; the driving disks $H_\omega$, $H_s$, $H_z$, $H_y$ and $H_x$ are coupled with the counting mechanisms $G_\omega$, $G_s$, $G_z$, $G_y$, $G_x$, respectively, by means of a pair of toothed wheels 63, and the driving disks $H'_\omega$, $H'_s$, $H'_z$, $H'_y$ and $H'_x$ are coupled with the counting mechanisms $G'_\omega$, $G'_s$, $G'_z$, $G'_y$, $G'_x$, respectively, by means of a pair of toothed wheels 64.

The driving disks $H''_x$ and $H''_y$ are coupled with shafts 65 or 66, respectively, which on their part are coupled with shafts 65' or 66', respectively, (cf. Fig. 3). For the sake of simplicity the couplings have been omitted in the drawings.

The shafts 65' and 66' are parallel to one another and are rotatably mounted upon a drawing table 67. The shaft 65' is provided with a right hand screw thread and is coupled with a shaft 71 by means of two pairs of bevel gears 68 and 69 as well as with a shaft 70 mounted on the drawing table 67. The shaft 71 is provided with a left hand screw thread and is so mounted on the drawing table 67 that its axis runs parallel with the axis of shaft 65. The shaft 65' and 71 serve as a slideway for a slide 72 which experiences a displacement along the shafts 65' and 71 when the driving disk H"x is actuated. On slide 72 a slide 74 carrying a drawing pencil 73 is disposed displaceably at right angles to the direction of displacement of the slide 72. The slide 73 engages a threaded spindle 75 rotatably mounted on slide 72 in such a manner that its axis lies parallel to the axes of shafts 65' and 71. The spindle 75 carries a bevel gear 76 meshing with a bevel gear 77 which is disposed displaceably along the shaft 66'. Shaft 66' is provided with a groove so that the bevel gear 77 must partake in the rotations of shaft 66'. In order to maintain the working contact between bevel gears 76 and 77 a catch 78 fitted to slide 72 is adapted to engage in a ring groove of the hub of bevel gear 77.

To make the apparatus ready for the plotting of photo plates, the apparatus is adjusted so that the photo plates 7 and 8 are in such a position relatively to the observation instrument 2 that the marks of the observation instrument 2 coincide with the principal points of the photo plates, (i. e., with those points where the optical axes of the camera objectives pass through the photo plates during the exposure) and that the directions of displacement of the Z-slides 20 and 20' as well as the guide rods 32 and 32' are at right angles to the photo plates. This is the position when the apparatus is in zero-adjustment and where the counting mechanisms $G_\omega$, $G_s$, $G_z$, $G_y$, $G_x$, $G'_\omega$, $G's$, $G'_z$, $G'_y$ and $G'_x$ indicate the initial reading. Starting from this position the groups of driving disks $H_x$, $H'_x$; $H_y$, $H'_y$; and $H_z$, $H'_z$, must be so set that the sums of the readings indicated by the counting mechanisms $G_x$ and $G'_x$, or $G_y$ and $G'_y$, or $G_z$ and $G'_z$ respectively correspond to the values of the components, measured on copying scale, of the camera base line respecting a rectangular spatial system of coordinates. In addition to this the driving disks $H_\omega$, $H'_\omega$, $H_s$, $H's$ and also, if necessary, $H''_\omega$, $H''_s$ must be set in such a manner that the directions of displacement of the Z-slides 20 and 20' have the same inclination to the photo plates 7 and 8 as the optical axes of the camera objectives had to the horizontal plane when the photo plates 7 and 8 were exposed.

All that is required to operate the apparatus is to continuously actuate the driving disks $H''_x$, $H''_y$ and $H''_z$ in such a manner that, to the observer at the observation instrument 2, the spatial image of the two marks of the observation instrument remains in apparent contact with the stereoscopic model of the landscape, as obtained from the two photo plates 7 and 8, during any movement of the spatial image of the marks relative to the model, or vice versa. The drawing pencil 73 then draws upon the drawing table 67 the horizontal projection of the line traced by the spatial image of the marks along the said stereoscopic model. The said line will be a contour line if the driving disk $H''_z$ is not moved.

Obviously the aforementioned apparatus can be used in conjunction with a great variety of devices which proved useful in connection with the known types of plotting machines such as, for instance, a device for interchanging the path of rays for the conjunction of successive photographs, or, a device permitting pictures presented to observer's eye being turned relative to one another, or, a device to alter the magnification of these pictures; or to provide switch-over devices coordinated to the driving disks $H''_x$, $H''_y$, and $H''_z$ in order to have the option of working either with right or left hand rotation of the driving disks at one and the same movement of the spatial image of the two marks of the observation instrument relative to the stereoscopic model obtained from the photo plates or vice versa; or a device for transmitting upon the drawing pencil the movement of the driving disks $H''_x$ and $H''_z$, or $H''_y$ and $H''_z$, respectively, instead of the movement of the driving disks $H''_x$ and $H''_y$.

I claim:

1. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of rods pivotally and slidably supported on said housing, pivoted and slidable connections between each of said rods and said picture carrying elements respectively, means for displacing said rods simultaneously in any one of three directions in space which are at right angles to each other, and means for adjusting said rod displacing means to change the directions of displacement of the rods from the initial three directions while maintaining said right angular relationship between the three directions of displacement.

2. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of rods pivotally and slidably supported on said housing, pivoted and slidable connections between each of said rods and said picture carrying elements respectively, means for adjusting said pivoted and slidable connections in a direction at right angles to the emulsion surfaces of said pictures, means for displacing said rods simultaneously in any one of three directions in space which are at right angles to each other, and means for adjusting said rod displacing means to change the directions of displacement of the rods from the initial three directions while maintaining said right angular relationship between the three directions of displacement.

3. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of supporting members, each being adjustably mounted on said housing for movement about two axes at right angles to each other, a first pair of slides each adjustably mounted on one of said supporting members for displacement toward or away from said supporting members, a second pair of slides each adjustably mounted on one of said first slides for displacement in a direction at right angles to the direction of displacement of said first slides, a third pair of slides each adjustably mounted on one of said second slides for displacement in a direction at right angles to the directions of displacement of said first and second slides, two guide rods, means pivotally and slidably supporting said guide rods on said housing, pivoted and slidable connections between each of said guide rods and said picture carrying elements respectively, pivoted joint connections between each of said guide rods and said third slides respectively, and means for operating the slides of each pair of slides through equal displacements.

4. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of supporting members, each being adjustably mounted on said housing for movement about two axes at right angles to each other, a first pair of slides each adjustably mounted on one of said supporting members for displacement toward or away from said supporting members, a second pair of slides each adjustably mounted on one of said first slides for displacement in a direction at right angles to the direction of displacement of said first slides, a third pair of slides each adjustably mounted on one of said second slides for displacement in a direction at right angles to the directions of displacement of said first and second slides, two guide rods, means pivotally and slidably supporting said guide rods on said housing, pivoted and slidable connections between each of said guide rods and said picture carrying elements respectively, means for adjusting said pivoted and slidable connections in a direction at right angles to the emulsion surfaces of said pictures, pivoted joint connections between each of said guide rods and said third slides respectively, and means for operating the slides of each pair of slides through equal displacements.

5. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of supporting members, each being adjustably mounted on said housing for movement about two axes at right angles to each other, a first pair of slides each adjustably mounted on one of said supporting members for displacement toward or away from said supporting members, a second pair of slides each adjustably mounted on one of said first slides for displacement in a direction at right angles to the direction of displacement of said first slides, a third pair of slides each adjustably mounted on one of said second slides for displacement in a direction at right angles to the directions of displacement of said first and second slides, two guide rods, means pivotally and slidably supporting said guide rods on said housing, pivoted and slidable connections between each of said guide rods and said picture carrying elements respectively, pivoted joint connections between each of said guide rods and said third slides respectively, and means for operating the slides of each pair of slides through equal displacements including a separate shaft operatively connected to each of said slides, a single means for simultaneously rotating the shafts of each pair of slides, and adjustable differential means interposed between the driving means and said shafts for adjusting the relative positions of the slides of each pair of slides.

6. In an apparatus for stereophotogrammetric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of supporting members, each being adjustably mounted on said housing for movement about two axes at right angles to each other, a first pair of slides each adjustably mounted on one of said supporting members for displacement toward or away from said supporting members, a second pair of slides each adjustably mounted on one of said first slides for displacement in a direction at right angles to the direction of displacement of said first slides, a third pair of slides each adjustably mounted on one of said second slides for displacement in a direction at right angles to the directions of displacement of said first and second slides, two guide rods, means pivotally and slidably supporting said guide rods on said housing, pivoted and slidable connections between each of said guide rods and said picture carrying elements respectively, pivoted joint connections between each of said guide rods and said third slides respectively, spring means attached to said guide rods and supported by the housing for eliminating the pressure of said guide rods on said pivoted joint connections, and means for operating the slides of each pair of slides through equal displacements.

7. In an apparatus for stereophotogrammatric plotting, a housing, a stereocomparator comprising a binocular observation instrument fixed to said housing, a pair of elements each for carrying one of a pair of stereoscopic pictures adjacent the observation instrument, said elements being movable in all directions in a plane parallel to the emulsion surfaces of said pictures, a pair of supporting members, each being adjustably mounted on said housing for movement about two axes at right angles to each other, a first pair of slides each adjustably mounted on one of said supporting members for displacement toward or away from said supporting members, a second pair of slides each adjustably mounted on one of said first slides for displacement in a direction at right angles to the direction of displacement of said first slides, a third pair of slides each adjustably mounted on one of said second slides for displacement in a direction at right angles to the directions of displacement of said first and second slides, two guide rods, means pivotally and slidably supporting said guide rods on said housing, pivoted and slidable connections between each of said guide rods and said picture carrying elements respectively, pivoted joint connections between each of said guide rods and said third slides respectively, means for operating the slides of each pair of slides through equal displacements including a separate shaft operatively connected to each of said slides, a single means for simultaneously rotating the shafts of each pair of slides, adjustable differential means interposed between the driving means and said shafts for adjusting the relative positions of the slides of each pair of slides, means for plotting contour lines, and mechanical connections from the single rotating means for the shafts of the first and second pairs of slides to the plotting means.

WALTHER BAUERSFELD.